US011785899B2

(12) United States Patent
Kers et al.

(10) Patent No.: US 11,785,899 B2
(45) Date of Patent: Oct. 17, 2023

(54) METHOD FOR CULTIVATING A CROP, CROP PRODUCTION UNIT AND CROP PRODUCTION SYSTEM

(71) Applicant: PlantLab Groep B.V., 's-Hertogenbosch (NL)

(72) Inventors: Martinus Kers, 's-Hertogenbosch (NL); Klaas Heijmans, 's-Hertogenbosch (NL); Leendert Pieter Jacob van Duijn, 's-Hertogenbosch (NL)

(73) Assignee: PlantLab Groep B.V., 's-Hertogenbosch (NL)

( * ) Notice: Subject to any disclaimer, the term of this patent is extended or adjusted under 35 U.S.C. 154(b) by 117 days.

(21) Appl. No.: 16/465,694

(22) PCT Filed: Dec. 1, 2017

(86) PCT No.: PCT/NL2017/050803
§ 371 (c)(1),
(2) Date: May 31, 2019

(87) PCT Pub. No.: WO2018/101829
PCT Pub. Date: Jun. 7, 2018

(65) Prior Publication Data
US 2019/0289799 A1    Sep. 26, 2019

(30) Foreign Application Priority Data

Dec. 1, 2016    (NL) ...................................... 2017907

(51) Int. Cl.
*C12Q 1/04*        (2006.01)
*A01G 22/00*    (2018.01)
(Continued)

(52) U.S. Cl.
CPC .............. *A01G 22/00* (2018.02); *A01G 7/045* (2013.01); *A01G 9/24* (2013.01); *Y02A 40/25* (2018.01); *Y02P 60/14* (2015.11)

(58) Field of Classification Search
CPC .......... A01G 22/00; A01G 7/045; A01G 9/24; C12Q 1/04; C12Q 1/06; C12Q 1/10; C12Q 1/12; C12Q 1/14; C12Q 1/22
See application file for complete search history.

(56) References Cited

U.S. PATENT DOCUMENTS 2,300,727 A * 11/1942 Durling .................. A01G 9/249
                                                                    47/58.1 R
5,174,793 A * 12/1992 Ikeda ....................... A01G 7/02
                                                                    47/58.1 R
(Continued)

FOREIGN PATENT DOCUMENTS

| WO | 2012/067499 A1 | 5/2012 |
| WO | 2014/066844 A2 | 5/2014 |
| WO | 2015/140820 A1 | 9/2015 |

*Primary Examiner* — Joshua D Huson
*Assistant Examiner* — Megan J Moroney
(74) *Attorney, Agent, or Firm* — Hoffmann & Baron, LLP

(57) ABSTRACT

A crop production system includes a number of crop production units which are coupled to a crop control centre. The crop production units are configured to perform a method for cultivating and producing a crop, where all climatological ambient factors and the light spectrum, which in their mutual relation determine the development of the crop, are regulated and controlled on the basis of a cultivation schedule which can be obtained from the crop control centre. For the purpose of production and development of a growth-promoting agent and/or crop protection agent and for the purpose of breeding a plant variety, one or more plants of a crop are at least substantially exactly reproduced in accordance with the cultivating method.

4 Claims, 2 Drawing Sheets

(51) Int. Cl.
  *A01G 7/04*   (2006.01)
  *A01G 9/24*   (2006.01)

(56) References Cited

U.S. PATENT DOCUMENTS

| | | | | |
|---|---|---|---|---|
| 5,981,958 | A * | 11/1999 | Li | G01N 21/6408 |
| | | | | 250/459.1 |
| 6,508,033 | B2 * | 1/2003 | Hessel | A01B 79/005 |
| | | | | 47/60 |
| 9,116,140 | B2 * | 8/2015 | Moon | G01N 21/3581 |
| 9,265,260 | B1 * | 2/2016 | Drouillard | A01G 7/045 |
| 9,603,316 | B1 * | 3/2017 | Mansey | G05B 15/02 |
| 9,932,604 | B1 * | 4/2018 | Nordick | A01H 6/4684 |
| 10,537,075 | B1 * | 1/2020 | Letchworth | A01H 6/4684 |
| 2003/0069697 | A1 * | 4/2003 | Mafra-Neto | A01B 79/005 |
| | | | | 702/2 |
| 2004/0115755 | A1 * | 6/2004 | Croy | G01N 33/84 |
| | | | | 435/25 |
| 2011/0153053 | A1 | 6/2011 | Kim et al. | |
| 2011/0252705 | A1 * | 10/2011 | Van Gemert | A01G 7/045 |
| | | | | 47/66.7 |
| 2014/0283442 | A1 * | 9/2014 | Thomas, III | A01G 7/06 |
| | | | | 47/1.5 |
| 2015/0020239 | A1 * | 1/2015 | von Maltzahn | A01C 1/06 |
| | | | | 800/298 |
| 2016/0278300 | A1 * | 9/2016 | Clendinning | A01G 9/20 |
| 2016/0345517 | A1 * | 12/2016 | Cohen | A01G 7/045 |
| 2018/0242539 | A1 * | 8/2018 | Bhattacharya | A01G 9/24 |

* cited by examiner

METHOD FOR CULTIVATING A CROP, CROP PRODUCTION UNIT AND CROP PRODUCTION SYSTEM

CROSS-REFERENCE TO RELATED APPLICATIONS

This application is the National Stage of International Application No. PCT/NL2017/050803, filed Dec. 1, 2017, which claims the benefit of Netherlands Application No. NL 2017907, filed Dec. 1, 2016, the contents of which is incorporated by reference herein.

FIELD OF THE INVENTION

The present invention is related to a method for cultivating or breeding a crop, a method for producing a crop protection agent and a method for demonstrating the presence of a pathogen in a carrier, and a crop production unit and crop production system therefor.

In particular, the present invention relates to a method for cultivating a crop, wherein the crop is subjected artificially to a number of growth factors in an at least substantially daylight-free, conditioned cultivation environment, which growth factors at least comprise an actinic radiation spectrum to which the crop is exposed, feeding and watering of the crop as well as leaf evaporation. It is noted here that a cultivation environment is conditioned within the scope of the invention when in respect of at least the relative air humidity and the ambient temperature, preferably together with a carbon dioxide concentration, a spatial climate therein is under control within an acceptable tolerance.

BACKGROUND OF THE INVENTION

A method of the type stated in the preamble is usually referred to as horticulture. Horticulture is the intensive cultivation on a commercial basis of crops, such as (leaf) vegetables, fruit, flowers pot plants, trees, as well as the development and production of bulbs and seeds. This is seen as the key to the worldwide issue of food security which, with the ever increasing world population, is becoming increasingly urgent. Glass horticulture traditionally occupies a special position here, wherein a crop is grown under glass in a wholly or partially conditioned environment. External climate influences can in this way be at least partially eliminated, the same applying for seasonal changes.

Horticultural land and other locations where horticulture could be practised have for generations been a scarce resource. Such production centres are moreover only rarely located close to centres of consumption such as cities and other densely populated areas. Efforts are usually therefore made to achieve an increasingly higher yield per square metre. This production efficiency can on the one hand be increased not only by generating a higher kilogram yield per square metre but also by improving the beneficial nutritional content per kilogram of product. In addition, the production efficiency benefits from the smallest possible loss as a result of a crop being affected by plant diseases. Crop protection agents such as insecticides, herbicides, fungicides and other biocides (pesticides), as well as plant breeding, are in this respect an essential factor in modern large-scale agriculture and horticulture, and of particularly great importance.

For both forms of efficiency improvement there is a need to control the composition of a crop at molecular level. On the one hand the beneficial content per kilogram of product can hereby be increased, while on the other the crop is readily reproducible, whereby tests with new crop species and varieties to be developed and with new biocides to be developed can be performed in a standardized manner so that a quicker and more reliable test result can thereby be obtained.

SUMMARY OF THE INVENTION

It is therefore an object of the present invention, among others, to provide a method for cultivating a crop and a cultivation environment configured for the purpose which make suchlike and other efficiency improvements possible.

In order to achieve the stated object a method of the type described in the preamble has the feature according to the invention that the crop is subjected during a cultivation period to a predetermined cultivation schedule which imposes a predetermined ratio of water and dry matter in the crop as well as defining a predetermined ratio of inorganic and organic constituents in the dry matter, wherein the cultivation schedule for each of said growth factors comprises prescribed growth parameters which define the growth factors in a predetermined mutual relation and impose the growth factors on the crop in the mutual relation prescribed by the cultivation schedule.

The invention thus provides a method with which a complete control and definition of the crop in terms of a final molecular composition thereof is possible not on the basis of genetics, growing substrate or nutrition but on the basis of artificially imposed climatic factors. This composition is therefore also fully reproducible from harvest to harvest, whereby the invention not only provides for a focus on and possible optimization of beneficial content per kilogram of yield, but also a standard experimental platform for testing susceptibility to plant diseases and/or growth-promoting agents can be tested.

According to the invention plant breeding can advantageously be adapted to this latter for the purpose of developing resistant plant species and plant varieties and/or developing new control agents and/or growth-promoting agents. The invention therefore also relates to a method for breeding a plant variety wherein one or more plants of a new plant variety are at least substantially exactly reproduced with the method according to the invention.

The invention also relates to a method for producing a crop protection agent, wherein the crop protection agent is tested on one or more plants of a crop which have been at least substantially exactly reproduced with the method according to the invention and have been exposed to a pathogen as well as to the crop protection agent. The pathogen is here normally a fungus, virus or bacteriological infection.

Phenotypical reproduction of genetically identical plants making use of the method according to the invention also thus enables the effectiveness of the crop protection agent to be tested particularly effectively and efficiently by preventively treating the plants therewith before they are exposed to the pathogen, or treating the plants curatively therewith after they have been exposed to the pathogen. Since use is always made of plants which are at least substantially identical in genetic and phenotypical respect, an exceptionally reliable idea can thus be obtained of the effectiveness of the agent, for instance with varying dosages and forms of administration, and/or of different agents.

The invention relates in addition to a method for demonstrating the presence of a pathogen in a carrier, in particular in seed, wherein one or more indicator plants susceptible to the pathogen are cultivated with the method according to the invention and are exposed to at least a sample of the carrier. The indicator plants are advantageously cultivated here with the method according to the invention in a manner such that, within their genotype, they are phenotypically extremely susceptible to the relevant pathogen. Surprisingly, it has been found that such a targeted focus on said growth parameters brings about a solid content of the crop which results in such an extreme susceptibility. The thus cultivated plants are then highly suitable as indicator for the presence of the pathogen.

Said methods for breeding a crop or for developing a crop protection agent and/or indicator plants all have the advantage that development time, and thereby development costs, can be drastically reduced in that because of the invention a cultivation cycle can be considerably shortened so that more cultivation cycles can be completed per unit time, and in that the crop here allows at least substantially exact reproduction to molecular level, and test results are therefore also more reliable and will produce results more quickly.

The invention is based here on the insight that this is eminently possible by gearing toward the above stated growth factors, i.e. a controlled supply of actinic artificial light—in particular an adapted spectrum, dosage and duration of photosynthetically active radiation (PAR) in combination with evaporation-regulating radiation—in a conditioned, daylight-free environment. It is noted here that the leaf evaporation of the crop will always be a resultant of an imposed root temperature of the crop, the relative air humidity and the leaf temperature. This latter is also determined in practice by the heat received by the leaf, in particular in the form of evaporation-regulating radiation such as infrared and far-red radiation to which the leaf system is exposed in intentional and controlled manner. This provides a stimulus to the leaf pores (stomata) to open. The root temperature controls the root activity, and thereby a root pressure for a sap flow through the crop. By opening to greater or lesser extent the leaf pores in the leaf will ensure that moisture can escape to greater or lesser extent via the leaf. In the case of a positive moisture deficit between the water balance inside the leaf (pore) and the relative air humidity outside the leaf (pore) this will result in evaporation on the leaf. In combination with the relative room air humidity together with the root temperature (root pressure), the evaporation-regulating radiation thus regulates the evaporation on the leaf system of the plant.

Many crops consist for the greater part of water, and only a small proportion of dry matter. It is nevertheless precisely in the proportion and the specific composition of the dry matter of the plant in which the nutritional value or other beneficial content of the crop is normally to be found. In order to increase the efficiency hereof a preferred embodiment of the method according to the invention has the feature that the crop is geared toward a predetermined ratio of inorganic and organic constituents in the dry matter. A further embodiment of the method according to the invention more particularly has the feature here that the crop is geared toward a mutual ratio of minerals and organic substances in the dry matter, in particular toward a carbon content in the dry matter, more particularly toward a carbon/nitrogen ratio in the dry matter.

Because of the invention it is possible here to gear toward and control not only the quantity of dry matter but also the composition thereof. A particular embodiment of the method according to the invention has the feature in this respect that the crop is geared toward a fixed, i.e. predetermined, composition of minerals and organic substances.

In addition to being consumed directly as source of food, some crops are cultivated for the purpose of then isolating a useful component therefrom. These are often in particular complex organic molecules which cannot be synthesized, or only with great difficulty or a low yield. Because of the invention it is possible if desired to gear toward an optimization of the proportion of such a beneficial constituent in the crop. With a view hereto a further preferred embodiment of the method according to the invention has the feature that the crop is geared toward an organic composition, in particular toward a content of carbohydrates, fats, amino acids, esters, aromatics, proteins, vitamins, fragrances, pigments and/or flavourings.

For the purpose, among others, of being able to perform and implement the method according to the invention in practice, the invention also relates to a crop production unit comprising an at least substantially daylight-free, conditioned cultivation environment for receiving and growing a crop therein in a cultivation period, which cultivation environment comprises a dark space with radiating means for generating actinic artificial light with a specific photosynthetically active radiation spectrum and for generating evaporation-regulating radiation, to which radiation spectrum and which evaporation-regulating radiation the crop is at least temporarily exposed, and with climate control means for regulating a number of growth factors, which growth factors comprise at least an ambient room temperature and a relative room humidity.

According to the invention such a crop production unit is characterized in that the climate control means and the radiating means are coupled to a control device which is able and configured to receive a cultivation schedule and on the basis thereof to control and set the radiating means and the climate control means during the cultivation period in a mode which imposes a ratio of water and dry matter in the crop determined by the cultivation schedule as well as a composition of inorganic and organic constituents in the dry matter determined by the cultivation schedule, wherein the cultivation schedule comprises prescribed growth parameters for the different growth factors which define the growth factors in a predetermined mutual relation and impose the growth factors on the crop in the mutual relation prescribed by the cultivation schedule. Because of the control device and the control on the basis of the cultivation schedule to be followed thereby the crop production unit can provide said growth factors continuously over the whole cultivation period in an intended mutual relation to the crop in completely autonomous manner. A uniform, optimal crop cultivation can hereby be achieved which is moreover wholly reproducible in terms of the cultivated end product. A control of the spatial carbon dioxide concentration can optionally be added to the climate control means in order to also keep this parameter completely under control.

The control device can be supplied per se with the cultivation schedule on site. In a practical embodiment the production unit is however characterized in that the control device is provided with telecommunication means and is able and configured to receive the cultivation schedule in digital form via the telecommunication means. The cultivation schedule can thus be obtained from a remote location and acquired in electronic manner by the control device.

A cultivation schedule will not infrequently come about as a result of trial and error and as a result of a considerable investment in terms of money and manpower. In order to protect this valuable information from improper use and unintended dissemination, a further particular embodiment of the crop production unit according to invention has the feature that the cultivation schedule comprises a digital data set which is encrypted. By means of a suitable encryption of the cultivation data unlawful use thereof can thus be prevented by selective issue and optional periodic updating of an associated appropriate decryption key.

In a particular embodiment cultivation schedules for different crops and for different crop cultivation of the same crop are developed and made available by a central organization and subsequently implemented at different crop production centres. The present invention also provides for this purpose a crop production system comprising a number of crop production units according to the invention which are coupled to a crop control centre, characterized in that the crop control centre is provided with data storage means for holding and issuing to the crop production units cultivation schedules from a set of cultivation schedules which can be processed by the crop production units in order to control the artificial lighting means and the climate control means.

BRIEF DESCRIPTION OF THE DRAWINGS

The invention will be further elucidated on the basis of an exemplary embodiment and an accompanying drawings. In the drawings.

The figures are otherwise purely schematic and not drawn to scale. Some dimensions in particular may be exaggerated to greater or lesser extent for the sake of clarity. Corresponding parts are designated in the figures with the same reference numeral.

DETAILED DESCRIPTION OF THE INVENTION

Figure 1:
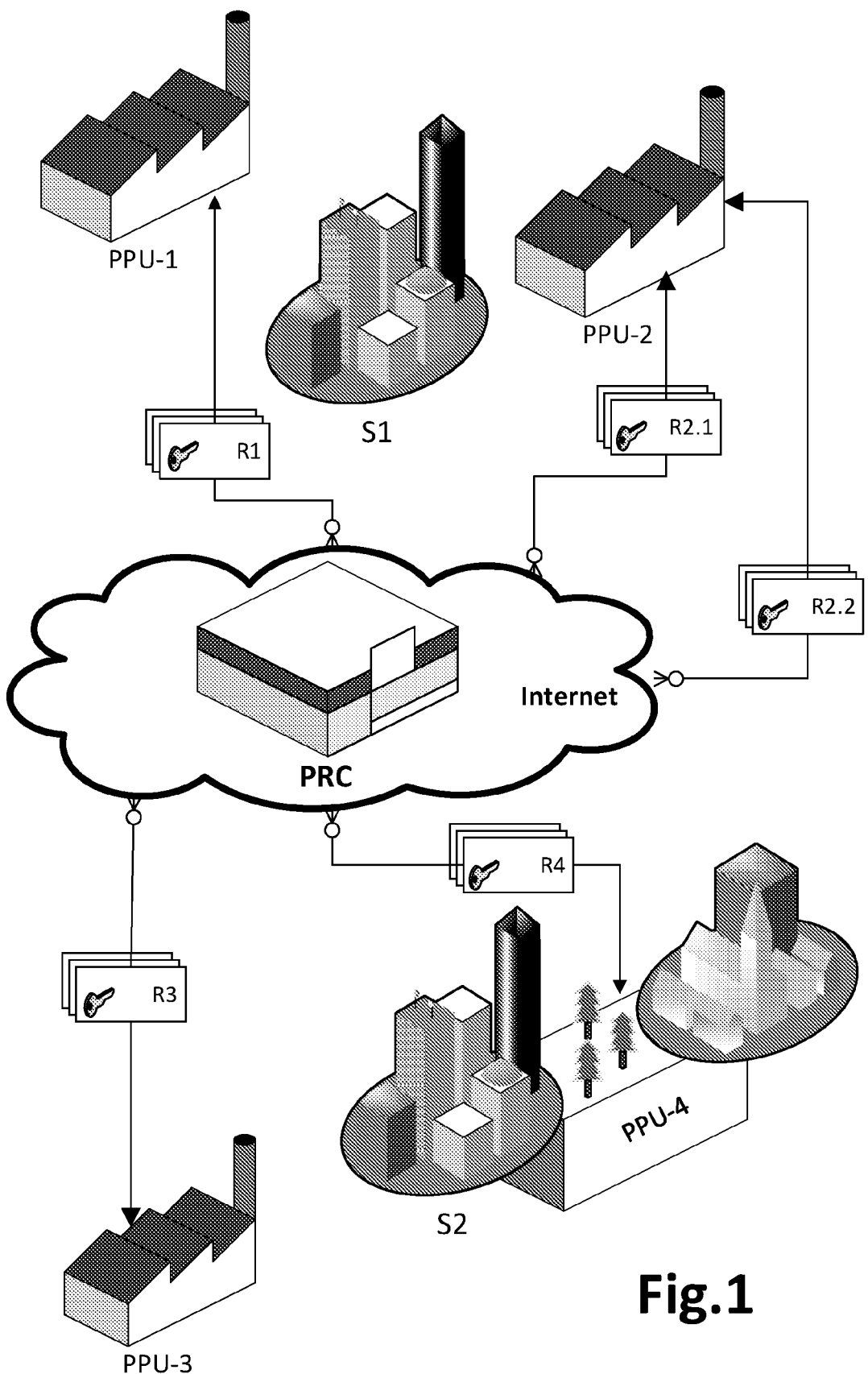
FIG. 1 shows schematically a setup of an exemplary embodiment of a crop production system according to invention.
Figure 2:
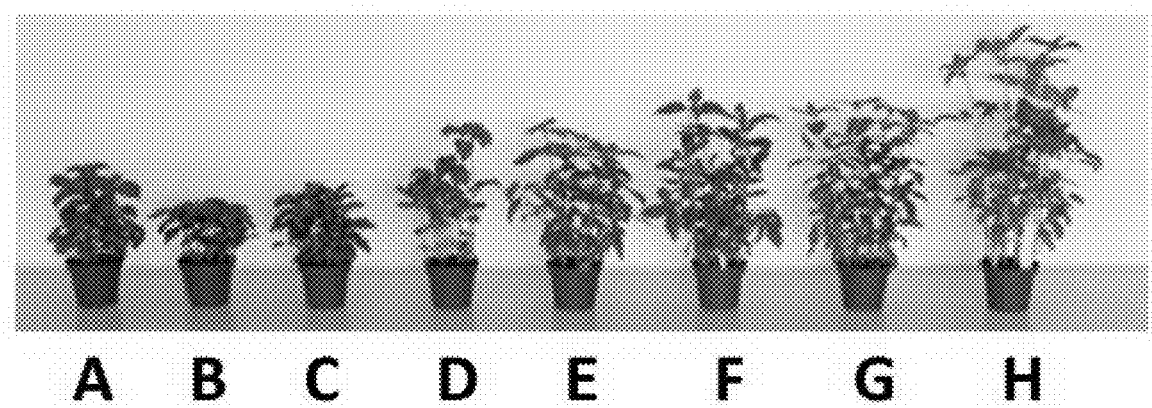
FIG. 2 shows a series of plants of the same genotype cultivated according to the invention in varying growth conditions.

The plant (re)production system shown in FIG. 1 comprises a central crop control centre PRC where research is done into crop development and specific cultivation schedules are developed on the basis of the research results. These cultivation schedules comprise values over the whole cultivation period in which a crop develops for a number of growth factors which in their mutual relation fully manage, control and determine the development and composition of the crop during the cultivation period. These growth factors comprise a spectrum of actinic artificial light to which the crop is exposed, an ambient room temperature, a leaf evaporation, a relative room humidity and a spatial carbon dioxide concentration in addition to nutrition and watering of the crop.

Figure 3:
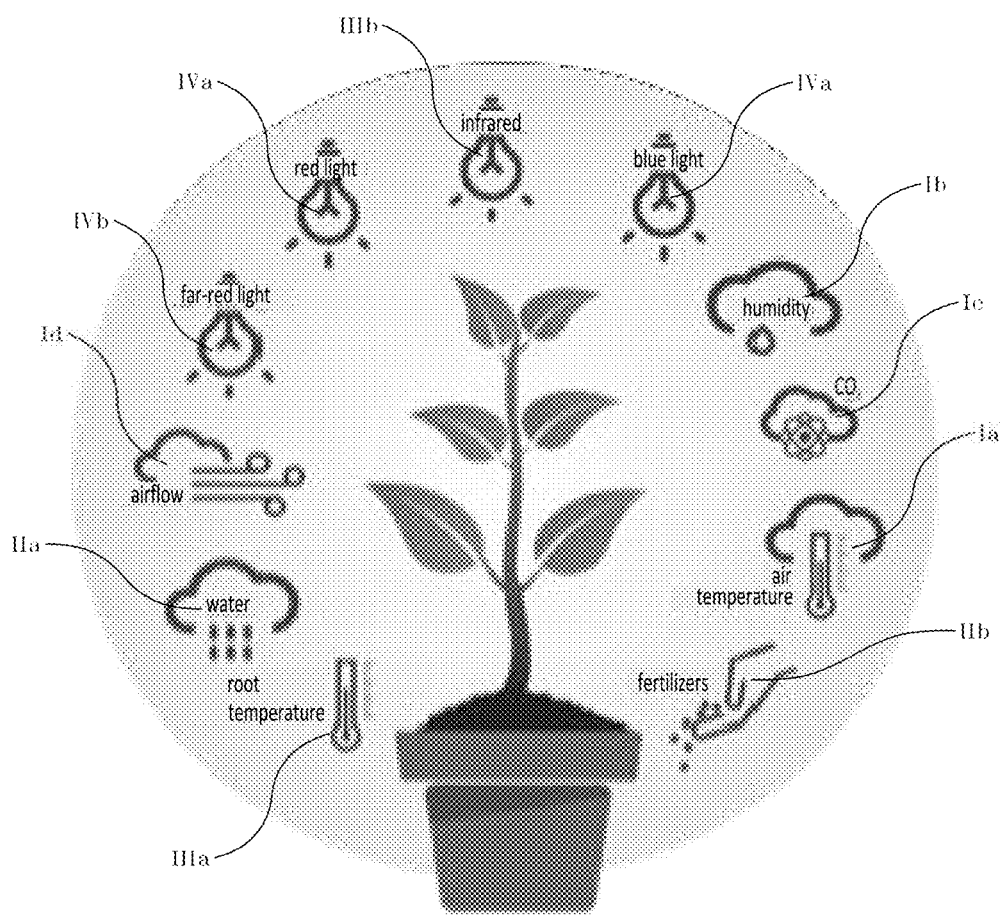
FIG. 3 shows a schematic overview of the growth factors imposed according to the invention by the cultivation schedule in the setup of FIG. 1.

These growth factors determining the final development of the crop are shown schematically in FIG. 3. This relates in the first instance to the spatial climate to which the crop is exposed and which is fully controlled within practical limits according to the invention. This involves the room temperature Ia, the relative air humidity Ib and the carbon dioxide concentration Ic. By continuously circulating an airflow with a controlled air speed Id through the space and guiding it outside the space with an air conditioning device this ambient climate is kept at a desired level within acceptable limits. Said parameters Ia, Ib, Ic, Id are prescribed in the cultivation schedule.

In addition, the cultivation schedule comprises values for watering IIa and fertilizing IIb for selected time intervals during the development of the crop. An evaporation from the crop is a resultant of the above parameters together with the root temperature Ma of the root system and evaporation-regulating (infrared) radiation IIIb on the leaf. Both are prescribed in the cultivation schedule and imposed on the crop with means provided for the purpose. Furthermore, the spectrum of actinic light is also fully controlled according to the invention. Cultivation takes place for this purpose in a daylight-free environment in order to counter the otherwise intervening influence of sunlight, and actinic artificial light is supplied instead. This artificial light comprises on the one hand photosynthetically active radiation IVa (PAR) in the blue and red part of the visible light, but can in addition also comprise other actinic components such as far-red IVb and UV radiation, in accordance with the crop and the desired control of the content thereof. It is thus found that, with all these values prescribed per time interval in such a cultivation schedule, the chemical content of the crop can be fully controlled in terms of a ratio of water/dry matter and in terms of the final dry matter composition of the crop, and can be substantially exactly reproduced.

The crop control centre PRC has digital storage means on which the developed cultivation schedules are stored and makes these schedules available to crop production units PPU1 . . . 4 which are subscribed to the crop control centre and four of which are shown in the figure. These production units can be provided at a random location, for instance close to an urban area S1, S2 or in a rural area, and both above ground PPU1 . . . 3 and underground PPU4.

The production units have a central control system for a climate control of the cultivation space and artificial lighting means to which the crop for cultivating is exposed. Daylight is excluded as far as possible from the cultivation space in order to eliminate the disruptive influence of sunlight, and a climate isolated from the surrounding area is otherwise also maintained inside the production unit. Each crop production unit comprises for this purpose climate control means for regulating at least the above stated growth factors, and the crop production units have artificial lighting means in the form of LED fittings with which a controlled light spectrum is generated to the crop which, in addition to photosynthetically active radiation (PAR), can particularly also comprise infrared radiation to enhance the development of the crop.

The crop production units PPU1 . . . 4 all have telecommunication means with which a connection to the crop control centre PRC can be established and maintained for the transfer of a cultivation schedule R1 . . . R2.2 which is obtained from the crop control centre PRC with a view to cultivating a specific crop in the respective production unit or to a specific cultivation of a crop. This is understood to mean gearing of a crop toward constituent substances as desired. In addition to a single cultivation schedule, multiple cultivation schedules can if desired also be implemented simultaneously here at a production unit, as indicated in the figure for the second production unit PPU-2. These then relate for instance to different crops which are being cultivated simultaneously in the production unit or to different modalities of the same crop thus being geared toward different constituent substances.

The cultivation schedule comprises all parameters and values of the growth factors shown in FIG. 3 which, together with the climate control means and the artificial lighting means, bring about this control in a production unit. Because this is sensitive business information and extremely valuable, the cultivation schedule is preferably exchanged in an encrypted form, this being represented in the figure by the key symbol. Each accredited production unit comprises telecommunication means with which the cultivation schedule can be received and has an appropriate decryption key for decoding the cultivation schedule. A central processing unit in the crop production unit translates the cultivation schedule to equivalent control commands corresponding thereto for the different components of the climate control means and for the artificial lighting means so that the crop will undergo specific climatological conditions and a light spectrum as intended with the cultivation schedule.

A text display of an exemplary cultivation schedule for cultivating basil is shown below by way of illustration. The cultivation cycle of basil from sowing to harvesting lasts for 25 days. During this cultivation cycle all relevant growth factors are imposed on the crop in fully controlled manner in accordance with the following schedule. It is noted here that within the context of the present invention the leaf evaporation of the crop will in practice normally be determined by a combination of an optionally specifically imposed root temperature, the relative air humidity and the exposure of the leaf of the crop to evaporation-regulating radiation, such as infrared and far-red radiation, from fittings provided for this purpose. The schedule begins on day 0 with sowing and lasts up to and including day 25 for harvesting. During this period the growth parameters are modified in stepwise manner as follows:

| CULTIVATION SCHEDULE I | | | | | |
|---|---|---|---|---|---|
| Parameter: | Day 0 → | Day 3 → | Day 6 → | Day 13 → | Day 20 → |
| Space Temperature (° C.) | 20 | 22 | 22 | 22 | 25 |
| Root Temperature (° C.) | 19 | 21 | 21 | 21 | 24 |
| Relative Humidity (%) | 99 | 84 | 78 | 58 | 50 |
| Blue ($\mu mol/m^2 \cdot s$) | 0 | 30 | 60 | 60 | 60 |
| Red ($\mu mol/m^2 \cdot s$) | 0 | 55 | 110 | 110 | 110 |
| Far-Red ($\mu mol/m^2 \cdot s$) | 0 | 25 | 50 | 50 | 50 |
| Radiation time (h) | 0 | 16 | 16 | 16 | 16 |
| Concentration $CO_2$ (ppm) | 350 | 350 | 1000 | 1000 | 1000 |
| Air speed (m/s) | 1.5 | 1.5 | 1.5 | 1.5 | 1.5 |
| Substrate | P7 | P7 | P7 | P7 | P7 |
| Electrical Conductivity | 1.0 | 1.0 | 2.0 | 3.5 | 3.5 |
| pH | 5.8 | 5.8 | 5.8 | 5.8 | 5.8 |
| Nutrition Scheme | 4 | 4 | 4 | 4 | 4 |

This schedule results in contents of fragrances and flavourings in the basil thus cultivated in a fully controlled environment which are significantly different when compared to basil resulting from outdoor cultivation. Making use of the above shown cultivation schedule the content of fragrances and flavourings in the final crop can be further increased by exposing the crop to UV radiation for one or more specific daily periods during the cycle. In the following schedule this period begins an hour before photosynthesis starts and continues until half an hour after the crop has also been subjected to the other radiation. This modification is incorporated in the following cultivation schedule and results in a corresponding modified crop composition:

| CULTIVATION SCHEDULE II | | | | | |
|---|---|---|---|---|---|
| Parameter: | Day 0 → | Day 3 → | Day 6 → | Day 13 → | Day 20 → |
| Space Temperature (° C.) | 20 | 22 | 22 | 22 | 25 |
| Root Temperature (° C.) | 19 | 21 | 21 | 21 | 24 |
| Relative Humidity (%) | 99 | 84 | 78 | 58 | 50 |
| Blue ($\mu mol/m^2 \cdot s$) | 0 | 30 | 60 | 60 | 60 |
| Red ($\mu mol/m^2 \cdot s$) | 0 | 55 | 110 | 110 | 110 |
| Far-Red ($\mu mol/m^2 \cdot s$) | 0 | 25 | 50 | 50 | 50 |
| Radiation time (h) | 0 | 16 | 16 | 16 | 16 |
| UV ($\mu mol/m^2 \cdot s$) | 0 | 0 | 0 | 0 | 5-10 |
| UV period (h) | 0 | 0 | 0 | 0 | 1.5 |
| Concentration $CO_2$ (ppm) | 350 | 350 | 1000 | 1000 | 1000 |
| Air speed (m/s) | 1.5 | 1.5 | 1.5 | 1.5 | 1.5 |
| Substrate | P7 | P7 | P7 | P7 | P7 |
| Electrical Conductivity | 1.0 | 1.0 | 2.0 | 3.5 | 3.5 |
| pH | 5.8 | 5.8 | 5.8 | 5.8 | 5.8 |
| Nutrition Scheme | 4 | 4 | 4 | 4 | 4 |

In addition to gearing toward constituent substances it is also possible to gear toward the appearance (phenotype) of the crop by imposing a predetermined, precisely defined cultivation schedule thereon. This is illustrated in FIG. 2A-H. This relates to basil having in each case the same genotype (species, variety) which has been subjected to different cultivation schedules in respect of a radiation spectrum to which the crop has been exposed, an ambient room temperature, a root temperature, a relative room humidity and a spatial carbon dioxide concentration. Within the same genotype this results in the shown variation in crop structure after the same cultivation period between sowing and harvesting. It is moreover possible to vary nutrition schemes, air speed and root/substrate temperature of the crop. It is important that the crop growth as shown in FIG. 2A-H is fully reproducible by applying the present invention. This means that, using the same cultivation schedule, the same crop growth will always be obtained after the cultivation period.

Roughly fifty different flavourings and fragrances determine the taste of basil. Five of these, including eugenol, geraniol and linalool, are found to be dominant here. A significantly increased content of these substances is obtained with the following cultivation schedule:

| CULTIVATION SCHEDULE III | | | | | |
|---|---|---|---|---|---|
| Parameter: | Day 0 → | Day 3 → | Day 6 → | Day 13 → | Day 20 → |
| Space Temperature (° C.) | 20 | 22 | 22 | 22 | 25 |
| Root Temperature (° C.) | 19 | 21 | 21 | 21 | 24 |

-continued

CULTIVATION SCHEDULE III

| Parameter: | Day 0 → | Day 3 → | Day 6 → | Day 13 → | Day 20 → |
|---|---|---|---|---|---|
| Relative Humidity (%) | 99 | 84 | 80 | 65 | 65 |
| Blue ($\mu mol/m^2 \cdot s$) | 0 | 15 | 30 | 30 | 30 |
| Red ($\mu mol/m^2 \cdot s$) | 0 | 35 | 85 | 85 | 85 |
| Far-Red ($\mu mol/m^2 \cdot s$) | 0 | 0 | 25 | 50 | 50 |
| Radiation time (h) | 0 | 20 | 20 | 20 | 20 |
| Concentration $CO_2$ (ppm) | 350 | 350 | 1000 | 1000 | 1000 |
| Air speed (m/s) | 1.5 | 1.5 | 1.5 | 1.5 | 1.5 |
| Substrate | P7 | P7 | P7 | P7 | P7 |
| Electrical Conductivity | 1.0 | 1.0 | 2.0 | 3.5 | 3.5 |
| pH | 5.8 | 5.8 | 5.8 | 5.8 | 5.8 |
| Nutrition Scheme | 4 | 4 | 4 | 4 | 4 |

It is also possible to gear the composition of the dry matter toward the desired proportion of organic and inorganic substances therein. This is a gearing toward the overall carbon/nitrogen ratio in the crop. When this also involves gearing toward the type or composition of organic and/or inorganic constituent substances, it is also possible with a cultivation schedule to respond to the specific wishes and requirements of the grower of the crop. The content of vitamins and/or phytohormones and/or chlorophyll can thus be increased, or creation of amino acids can for instance be stimulated.

A more specific exemplary embodiment of the method according to the invention is the cultivation of *cannabis*, or marijuana, in a conditioned, daylight-free aboveground or underground cultivation environment, normally referred to as city farming. *Cannabis* has a number of main constituents, each with its own specific effect. The eighty constituents only found in *cannabis* are known as cannabinoids. These affect the receptors in the human body and cause effects in the nervous system and brain.

THC is the best-known and most frequently encountered cannabinoid in *cannabis; this stands for* Δ−9-tetrahydrocannabinol. This cannabinoid is responsible for the most important psychoactive effect experienced after consumption of *cannabis*, it stimulates parts of the brain and thus causes the release of dopamine—this creates a sense of euphoria and well-being. THC also has anaesthetizing effects and alleviates the symptoms of pain and inflammation. In combination they provide a tremendous sense of relaxation.

Cannabidiol, or CBD, is the second most common cannabinoid in marijuana. This substance has good possible applications in the field of medicine, and is the constituent most highly suitable for medicinal use. It is thought that this non-psychotic constituent reduces and regulates the effects of THC. This means that species which comprise a relatively large amount of CBD in addition to THC cause a much more lucid psychotic experience than species comprising relatively little CBD. CBD has a long list of medicinal properties. The most important are the reduction of chronic pain, inflammations, migraine, arthritis, spasms, epilepsy and schizophrenia.

The present invention allows the development and reproduction, on the basis of a cultivation schedule geared thereto, of a phenotype within the same genotype *cannabis* which has such an increased proportion of CBD. *Cannabis* for medicinal applications can hereby be provided in significantly more efficient manner.

It is particularly also possible using the invention to comply with a desired value of a selected mineral quality index on the basis of a cultivation schedule adapted thereto, such as for instance the so-called Eric Gun Index (EGI), which represents a mineral composition in the form of a formula in which elementary concentrations of elements such as nitrogen (N), calcium (Ca), magnesium (Mg) and potassium (K) are incorporated. This is a standard, for instance in the case of fruit, with which a predetermined resistance of the crop to specific plant diseases, a desired flavour and/or a storage quality can be imposed, and as it were built in, following picking. In addition to or instead of the EGI, it is also possible here if desired to gear toward another index such as normally applied as standard in the market in the field of a determined crop (type). A relevant parameter can for instance also be found in the ratio of potassium and calcium in the crop. It is also possible to gear specifically toward this if desired by applying a cultivation schedule adapted thereto.

Not only can the content or appearance (phenotype) of the crop thus be artificially imposed and controlled within the same genotype by subjecting the crop to a cultivation schedule specifically adapted thereto, a resilience or, conversely, sensitivity to plant diseases, particularly as a result of an infection with micro-organisms such as a fungus, bacteria or virus, or to insects can also be influenced by imposing a specific cultivation schedule. An increased resilience results in a better resistance of the crop, and so a reduced susceptibility, while a standard sensitivity can on the contrary serve as standardized test platform for tests with newly developed biocides which can thus be performed in a standardized manner, so that a quicker and more reliable test result can thereby be obtained.

An increased sensitivity to for instance fungi or viruses can on the other hand also be brought about on the basis of a carefully selected cultivation schedule. This is advantageous if the crop is applied as indicator of the possible presence of a specific fungus or a specific virus in a determined environment. An example hereof is for instance the culture of the plants *Nicotiana* (tobacco) and *Chenopodium* (white goosefoot) which are used in virus tests. The sensitivity of the crop to these viruses can be controlled with different cultivation schedules. The same applies for sensitivity to fungi such as for instance downy mildew. The plant can here also be geared toward difference in sensitivity using different cultivation schedules. Not only can the susceptibility to virus or fungus thus be significantly increased or decreased, this can also be repeated in a fully reproducible manner, whereby each plant develops with certainty a standardized, constant susceptibility to a specific pathogen or group of pathogens. It is hereby possible to test in a reliable and standardized manner for the presence of this pathogen, such as a virus, bacteria or fungus, by exposing a thus cultivated indicator plant to a sample of a carrier sampled for the purpose and subsequently determining whether the crop has been adversely affected or not.

Also important is that the cultivation schedule comprises a complete control of all ambient factors determining the development and content of the crop. The only remaining factor not imposed by the cultivation schedule is the genetics of the crop. Within the bounds of this genetic content of the crop the development of the crop is however imposed wholly by the cultivation schedule and controlled thereby. It is thus possible to ensure that the end product will always have at least substantially the same composition, whereby a reproducibility is achieved which is hitherto unrivalled. This provides a valuable starting point for breeding research into new plant varieties and species and for the development of new crop protection agents, wherein for instance a resistance to plant diseases can thus always be evaluated on the same standardized plant.

Although the invention has been further elucidated on the basis of only a single exemplary embodiment, it will be apparent that the invention is by no means limited thereto. On the contrary, many variations and embodiments are still possible within the scope of the invention for a person with ordinary skill in the art. Although the examples are limited to basil, *cannabis*, tobacco (*Nicotiana*) and white goosefoot (*Chenopodium*), any crop is in principle suitable for a closed and fully controlled cultivation and cultivation system according to the invention, such as for instance, in addition to herbs, many forms of leaf crop, in particular leaf vegetables and other crops with a specific beneficial constituent substance which can be isolated therefrom, such as, in addition to *cannabis*, for instance also *stevia*, with a view to extracting therefrom a sweetener intended for human consumption, as well as crops with fragrances and pigments for perfumes, foodstuffs and the like. The invention does in fact open the way to a wholly new form of horticulture in which it is no longer nature but human beings who control the development of the crop within the boundaries still defined only by the genetic content of the crop.

The invention claimed is:

1. A method for demonstrating the presence of a particular pathogen in a carrier, comprising:
    providing one or more indicator plants of identical genotype that are susceptible to said pathogen;
    cultivating the one or more indicator plants to have substantially identical phenotypes, by artificially subjecting said indicator plants to a number of growth factors in an at least substantially daylight-free, conditioned environment, which growth factors comprises at least for said indicator plants:
        a substantially identical photosynthetically active radiation spectrum,
        a substantially identical ambient room temperature, and
        a substantially identical leaf evaporation; and
    subjecting the indicator plants during their cultivation period to a common predetermined cultivation schedule, imposing a predetermined ratio of water and dry matter on the indicator plants as well as defining a predetermined composition in the dry matter, wherein said cultivation schedule comprises common values for said growth factors for said indicator plants;
    exposing said indicator plants to at least a sample of said carrier, and
    monitoring said indicator plants to determine whether the indicator plants have been adversely affected or not, thereby indicating the presence or absence of the pathogen in said carrier.

2. The method of claim 1, wherein the carrier is a seed or plurality of seeds.

3. A method for demonstrating the presence of a particular pathogen in a carrier, wherein one or more indicator plants of identical genotype that are susceptible to said pathogen are cultivated to have substantially identical phenotypes in that:
    said indicator plants artificially are subjected to a number of growth factors in an at least substantially daylight free, conditioned environment, which growth factors comprises at least for said indicator plants:
        a substantially identical photosynthetically active radiation spectrum;
        a substantially identical ambient room temperature and
        a substantially identical leaf evaporation,
    wherein the indicator plants are subjected during their cultivation period to a common predetermined cultivation schedule, imposing a predetermined ratio of water and dry matter on the indicator plants as well as defining a predetermined composition in the dry matter,
    wherein said cultivation schedule comprises common values for said growth factors for said indicator plants;
    wherein said indicator plants are cultivated to have an increased sensitivity to said pathogen;
    wherein said indicator plants are exposed to at least a sample of said carrier; and
    monitoring said indicator plants to determine whether the indicator plants have been adversely affected or not, thereby indicating the presence or absence of the pathogen in said carrier.

4. The method of claim 3, wherein the carrier is a seed or plurality of seeds.

* * * * *